June 8, 1965    J. F. CAMPOLONG    3,187,711
MAGNETIC PRESSURE INDICATOR
Filed Dec. 19, 1963    2 Sheets-Sheet 2

3,187,711
MAGNETIC PRESSURE INDICATOR
Joseph F. Campolong, Westbury, N.Y., assignor to Pall Corporation, Glen Cove, N.Y., a corporation of New York
Filed Dec. 19, 1963, Ser. No. 331,869
8 Claims. (Cl. 116—70)

This invention relates to pressure indicating devices and, more particularly, to a new and improved magnetic device for indicating the occurrence of pressure differences greater than a predetermined value, and for retaining such indication until such pressure difference is corrected.

In hydraulic systems wherein fluid such as oil or the like is passed through a filter, it is desirable to provide external means for indicating clogging of the filter element such as by accumulation of sufficient dirt to impede the flow of fluid. Inasmuch as the pressure drop across the filter increases in proportion to the accumulation of dirt in the filter element, a suitable indication may be obtained by utilizing a differential pressure device set to be actuated when the pressure drop in the filter reaches a predetermined value. At low temperatures, however, the increased viscosity of many fluids such as oil results in an increased pressure drop across the filter even though the filter element may not be clogged.

Accordingly, it is an object of this invention to provide a new and improved pressure indicator utilizing magnetic attraction settable to respond when a predetermined pressure is obtained.

Another object of the invention is to provide a pressure indicator of the above character adapted to detect clogging of the filter element.

A further object of the invention is to provide a pressure indicator of the above type which does not respond to increases in pressure resulting from low temperature.

These and other objects of the invention are accomplished by utilizing a first magnetic element arranged to attract a second magnetic element as long as the two elements are separated by less than a predetermined distance. In one embodiment of the invention, the first magnetic element is movable with a piston responsive to changes in pressure and is normally biased toward the second magnetic element by a predetermined force. In another embodiment, the first magnetic element is movable with a flexible diaphram, in effect a piston of high surface area to increase sensitivity to small pressure changes. The second magnetic element, normally retained toward the first element by magnetic attraction, is urged away from the first element by an annular spring disc capable of overcoming the magnetic attraction when the two elements are separated by the predetermined distance. In order to prevent actuation at low temperatures, a bimetallic strip can be positioned to prevent motion of the second magnetic element when the temperature is below a predetermined value.

The annular spring disc 16 can be made to flex without change in direction of the force-deflection characteristic on its deflection curve, in which event it is self-closing when the acuating pressure is reduced, or to pass through a change in direction of the force-deflection characteristic on its deflection curve, in which event it must be reset manually.

Disc thickness, amount of bow, disc diameter and annular opening diameter are determined by the pressure differential to be resisted, i.e., the resistance to be offered by the spring action of the disc.

The spring disc of the invention is made of material of high yield strength and high hardness. Materials having minimum yield strengths of 30,000 to 250,000 p.s.i.g. can be used, with Rockwell hardness of the order of C–45. Steel, stainless steel, and nickel chromium alloys are satisfactory, as also are certain synthetic resins such as polytetrafluoroethylene and polyoxymethylene. Metal spring discs surfaced with a resilient natural or synthetic resin can also be used. Metal spring discs of the desired type are available, and are known as Belleville washers.

The disc can be uniform in thickness throughout or can vary in thickness, thinner at the center than at the edge, to give improved flexing and sealing. The disc can also have either smooth or serrated internal and external surfaces and can also have holes or slots in it to give improved flexing and sealing.

Conditions of all kinds can be met by appropriate design of the spring disc to any load-deflection characteristics required in the system. The geometry of these discs is established by the discs' outside diameter and inside diameter, its free height measured from the inside edge (along to perpendicular to the outside edge) and its thickness. Proper selection of the geometry, using mathematical tables and equations of Fortini, Machine Design, September 4, 1958, "Conical-Disc Springs," will give a valve capable of pressure-relieving response to any type of load in any desired way.

Further objects and advantages of the invention will be apparent from a reading of the following description in conjunction with the accompanying drawings in which.

Figure 1:
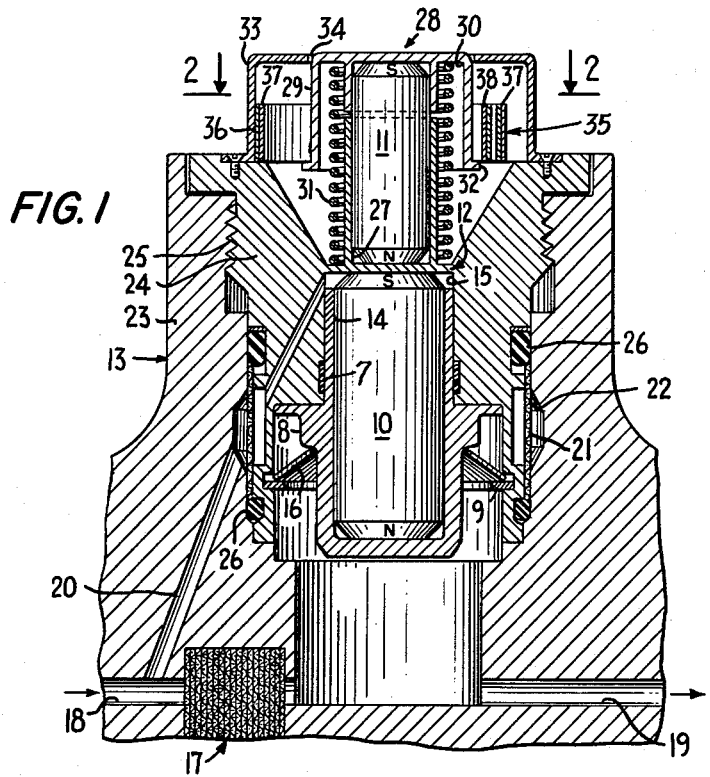
FIGURE 1 is a view in longitudinal section taken through a typical pressure indicator arranged according to the invention.
Figure 2:
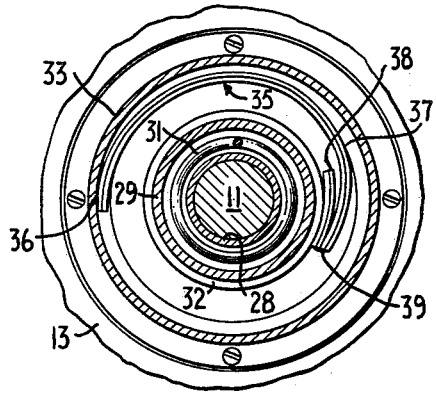
FIGURE 2 is a sectional view taken on the lines 2—2 of FIGURE 1 and looking in the direction of the arrows.

As shown in FIGURES 1 and 2, a representative pressure indicator arranged according to the invention comprises two magnetic elements 10 and 11 coaxially mounted on opposite sides of a separating wall 12 within a housing 13. Preferably, both the elements 10 and 11 are composed of permanently magnetized Alnico V or the like and are positioned with opposite magnetic poles adjacent the wall 12 so that each is drawn toward the wall by the resulting force of attraction. If desired, however, only one of these elements need be a permanent magnet and the other may be formed of suitable magnetic material such as iron, for example.

Mounted in a tubular piston 14, the magnet 10 is slidably supported in a cylindrical bore 15 in the housing 13 and is urged toward the wall 12 by an annular spring disc 16, in this case a stainless steel Belleville washer seated on the retaining ring 9 held in a groove in the bore 15. The inner periphery of the disc 16 seats beneath the cap portion 8 of the piston 14. In order to prevent fluid from passing from one end of the bore 15 to the other, a liquid-tight seal is provided between the bore and the piston 14 by a ring 7 of "Teflon" or other suitable material. The spring disc 16 is selected to snap through zero on its deflection curve, and change direction of bow, according to the desired actuating pressure, to permit the piston 14 to move downwardly in the bore 15 when the pressure at the upper end of the piston 14 exceeds that at the lower end by an amount equal to the actuating pressure, and retain that position until reset.

In the illustrated embodiment of the invention, the pressure indicator is arranged to measure the pressure drop across a filter 17, for example. Thus, fluid under pressure is applied to the filter from an inlet line 18 and emerges through an outlet line 19, the difference in pressure between the inlet and outlet lines being a measure of the resistance and, therefore, the clogging of the filter. In order to detect this pressure difference, a duct 20 leads from the inlet line 18 to the end of the cylindrical bore 15 adjacent the wall 12 while the other end of the bore communicates with the outlet line 19.

If desired, in order to prevent dirt carried by the incoming fluid from reaching the bore 15 and to make certain that any fluid which might pass through the bore to the outlet line 19 is clean, a suitable filter element 21 may be inserted in an enlarged portion 22 of the duct 20. As shown in FIGURE 1, the enlarged portion 22 may, for example, be a ring-shaped cavity in the housing 13 surrounding one of the magnetic elements. Within this cavity, an annular filter element is inserted, thereby providing a high dirt capacity with low resistance to fluid flow. For ease in assembly and replacement of the filter element 21, the housing 13 may be separable through the enlarged area 22 into two portions 23 and 24 which are joined as by screw threads 25, suitable glands 26 being provided to seal the enlarged area of the duct.

On the other side of the wall 12, the magnetic element 11 is slidably received at one end in a bore 27 coaxial with the bore 15. Secured to the opposite end of the magnet 11 by a press fit, for example, a cap 28 includes a tubular wall 29 extending toward the housing 13 and radially spaced from the magnet. The annular recess 30 thus formed receives a coil spring 31 which extends from the cap 28 to the housing 13 to urge the cap and the magnet 11 away from the wall 12. This spring is selected so that it is retained in the stressed condition with the magnet 11 against the wall 12 by the attractive force of the two magnetic elements as long as the adjacent poles of the two magnets are separated by less than a predetermined distance, for example, one-sixteenth of an inch. An annular spring disc can be used in lieu of a coil spring. Whenever the magnetic element 10 is moved away from the element 11 so that their adjacent poles are separated by more than a sixteenth of an inch, however, the decreased force of magnetic attraction resulting therefrom is overcome by the force of the spring 31 and the cap 28 and element 11 are driven away from the wall 12.

In order to prevent the magnet 11 from being driven completely out of the bore 27, the tubular wall 29 terminates in a radial flange 32, and a drum 33, having a central aperture 34 slightly smaller than the flange 32 but large enough to permit the cap 28 to pass through it, is mounted on the housing 13. Also, a conventional bimetallic element 35 is mounted at one end on the inside surface of the drum 33 as by a weld 36. As best seen in FIGURE 2, the bimetallic element is preferably comprised of two arcuate strip portions 37 and 38 joined by a weld 39 and both arranged to bend inwardly with decreasing temperatures. At normal temperatures, the element 35, which is adjacent the wall 29 and just above the flange 32 when the indicator is not actuated, has a minimum radius greater than that of the flange 32 and permits the cap 28 to rise through the aperture 34 on actuation. However, at temperatures below a preselected value at which the viscosity of the fluid to be filtered rises appreciably, for example, 32° F., the element 35 contracts inwardly so that the inner strip 38 extends over the flange 32, thus preventing actuation of the pressure indicator.

In operation, fluid under pressure from the inlet line 18 passes through the duct 20 and the filter 21 to the top of the cylindrical bore 15, urging the magnet 10 and the piston 14 downwardly against the force of the spring disc 16 and the pressure from the outlet line 19. Whenever the difference between the inlet and outlet pressures is greater than the force of the spring disc 16, the spring disc snaps through and reverses direction of bow, carrying with it the piston 14 which is thereby driven downwardly in the bore 15. After the magnet 10 has moved to a position more than one-sixteenth of an inch away from the magnet 11, the attractive force between the two magnets is less than the force of the spring 31 and the magnet element 11 is driven away from the wall 12 until the flange 32 abuts the inside surface of the drum 33. Thus, the cap 28, which, if desired, may be of a suitable eye-catching color such as red, rises through the aperture 34 to indicate that the pressure difference is greater than the predetermined value in accordance with which the spring disc 16 has been selected. As for example, the spring disc 16 may be arranged to permit the magnet 10 to be driven away from the wall 12 when the pressure difference exceeds 35 p.s.i. and return when the pressure is less than 25 p.s.i., the cap 28 then remaining in this position until the spring disc 16 is reset by pushing piston 14 back up manually, upon disassembly to provide access to the piston 14.

It will be apparent that by suitable dimensioning of the drum 33 and the radial flange 32, the magnet 11 may be permitted to move more than one-sixteenth inch from the normal position of the magnet 10. In this case, the pressure indicator also must be reset by manual depression of the cap 28. On the other hand, if the flange 32 is positioned to stop the magnet 11 less than one-sixteenth inch from the normal position of the magnet 10, the indicator will be automatically reset by the attractive force of the magnets, which is greater than that of the spring 31 at this distance, when the magnet 10 is returned to the wall 12.

At temperatures below 32° F., for example, the thermostatic element 35 contracts to move the inner end of the strip 38 over the flange 32. Thus, when the piston 14 and the magnet 10 are moved away from the wall 12 by pressure resulting from increased viscosity of the fluid, the lower edge of the strip 38 intercepts the flange 32 preventing a false indication of filter clogging.

Figure 3:
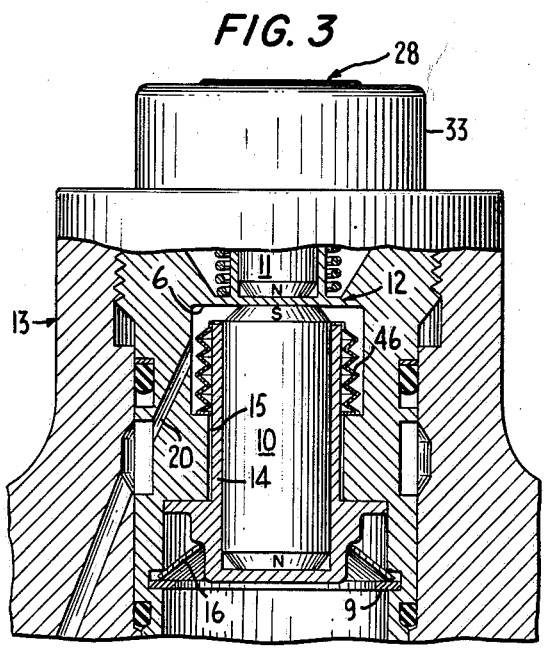
FIGURE 3 shows another embodiment of the invention arranged to prevent leakage of fluid through the indicator.

As illustrated in FIGURE 3, another pressure indicator may be arranged according to the invention without requiring a filter in the duct 20 or a gasket in the cylindrical bore 15. In this embodiment, a bellows 46 formed of metal or other suitable material is mounted between the top of the piston 14 and the cylindrical bore 15 within a suitably enlarged portion 6 of the bore. In this manner, fluid is positively prevented from passing from the enlarged portion 15a to the bore 15, thus eliminating the need for a filter or gasket. Furthermore, if desired, this form of pressure indicator may be utilized to indicate an actual pressure instead of a pressure difference by opening the lower pressure of the bore 15 to the atmosphere rather than to the outlet line. Similarly, an absolute pressure may be indicated with this embodiment by connecting the bore 15 to a vacuum.

In operation, fluid from the duct 20 fills the enlarged portion 6 driving the piston 14 downward when the fluid pressure exceeds that of any fluid in the bore 15 and the force of the spring disc 16. As the piston moves downwardly, the bellows 46 closes in accordion fashion but no fluid from the duct 20 passes into the bore 15. When the magnets 10 and 11 are more than one-sixteenth of an inch apart, the spring 31 drives the magnet 11 away from the wall 12 in the manner described above.

Figure 4:
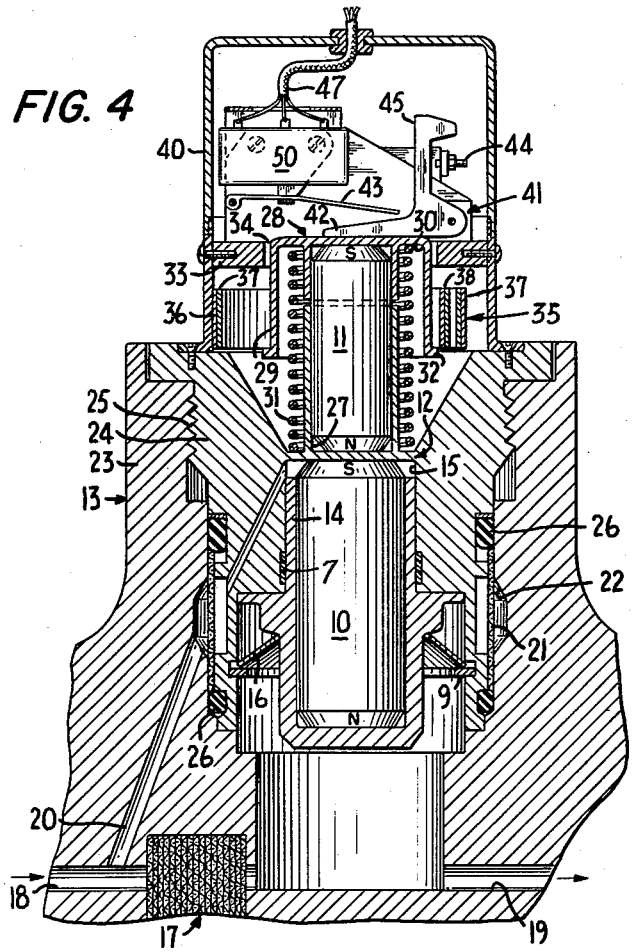
FIGURE 4 is a view in longitudinal section through a pressure indicator of FIGURE 1 arranged to actuate a switch.

In the embodiment of the invention shown in FIGURE 4, the pressure indicator is adapted to provide an electrical signal upon actuation of the indicator. To this end, a switch 50 is mounted in a sleeve 40 affixed to the housing 13. Also mounted in the sleeve a lever 41 is pivotally supported with one arm 42 extending above the cap 28. Positioned above the arm 42 a switch actuator 43 is movable by the arm to actuate the switch 50 when the cap 28 rises out of the drum 33. In order to restrict the motion of the magnet 11, an adjustable set screw 44 is mounted in the sleeve 40 to intercept the other arm 45 of the lever 41. If desired, this screw may be set to stop the lever 41 after actuation to hold the magnet 11 within one-sixteenth inch of the normal position of the magnet 10, thereby making the indicator automatically resettable in the manner described above. If the lever motion is not so restricted, the indicator may be reset by manual rotation of the lever 41. Suitable conductors 47 from the switch 50 are arranged in any conventional manner to complete appropriate electrical circuits which may be adapted, for example, to shut off flow or to give a remote indication of actuation whenever the switch is operated or reset.

In operation, the top of the cylindrical bore 15 is connected to a source of high pressure through duct 20 and the filter 21. The high pressure urges the magnet 10 and the piston 14 downwardly against the force of the spring disc 16 and the pressure in the bore below the piston 14. The bore may be connected to a source of low pressure or may be opened to the atmosphere, in which case the device acts as a total pressure indicator. Alternatively, the bore may be connected to a source of vacuum in which case the device acts as an absolute pressure indicator. Whenever the difference between the pressures above and below the piston is greater than the force of the spring disc 16, the spring disc snaps through, and reverses direction of bow, carrying with it the piston 14 which is thereby driven downwardly in the bore 15. After the magnet 10 has moved to a position more than one-sixteenth of an inch away from the magnet 11, the attractive force between the two magnets is less than the force of the spring 31 and the magnet element 11 is driven away from the wall 12 until the flange 32 abuts the inside surface of the drum 33. Thus, the cap 28 rises whenever the pressure difference is greater than the predetermined value in accordance with which the spring disc 16 has been selected. As an example, the spring disc 16 may be arranged to permit the magnet 10 to be driven away from the wall 12 when the pressure difference exceeds 35 p.s.i. and return when the pressure is less than 25 p.s.i. Driven by the spring 31, the magnet 11 rises through the aperture 34 turning the lever 41 to actuate the switch 50. If the set screw 44 is appropriately adjusted to restrict the motion of the magnet 11, return of the magnet 10 to its normal position draws the magnet 11 back toward the wall 12, restoring the switch.

Figure 5:
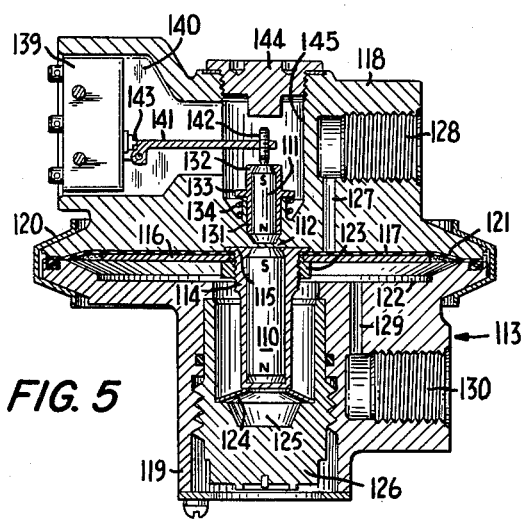
FIGURE 5 is a view in longitudinal section taken through another embodiment utilizing a diaphragm to increase sensitivity to very small changes in pressure.

In FIGURE 5 is illustrated another embodiment of the invention, utilizing a diaphragm to increase sensitivity to small changes in pressure, and capable of response over a range of pressure differentials of from 0.01 up to about 250 p.s.i. In this device the lower piston and magnetic element is replaced by a magnetic diaphragm assembly which is biased toward the separating wall by an annular spring disc. The diaphragm component of the assembly can be a flexible magnetic material or it can be composed of a flexible magnetizable or non-magnetic diaphragm material and a second magnetic element so associated therewith that both are movable in response to changes in pressure.

As illustrated in FIGURE 5 the magnet 110 is mounted in a tubular sleeve 114 having an enlarged head portion 115. The sleeve is inserted through the central aperture of a plate 116 attached thereto by a nut 123 and the plate 116 and enlarged head 115 of the sleeve between them hold a flexible rubber diaphragm 117 in a liquid-tight seal. The diaphragm is thus free to reciprocate towards and away from the wall 112 and is urged towards the wall by the annular spring disc 124 which, at its inner periphery, rests against the bottom portion of the sleeve 116. The annular spring disc is supported within the housing 113 at its outer periphery upon the screw 126 which may also be used to adjust the force exerted by the annular spring disc. The screw is provided with a central recess 125 which allows space for the annular spring disc to freely flex within the housing and to snap through zero on its deflection curve, if this is desired. The annular spring disc 124 is selected according to the desired actuating pressure to permit the diaphragm assembly to move downwardly when the pressure at the upper surface of the diaphragm exceeds that at the lower surface by an amount equal to the actuating pressure. The design criteria and materials of construction of the annular spring disc are as set forth above.

The attachment between the diaphragm 117 and the plate 116 can be improved, if desired, by bonding the two together. The assembly of the magnet 110, sleeve 114, plate 116, nut 123 and diaphragm 117 together constitutes a magnetic diaphragm assembly since all respond together to the force exerted by the annular spring disc and to magnetic attraction due to element 111 as well as to the pressure actuated movement of the diaphragm 117. The diaphragm may be formed of any flexible material, such as for example, a flexible metal sheet or a flexible synthetic resin or cellulose derivative, such as celluose acetate, polytetrafluoroethylene, polypropylene, polyethylene or polyvinylidene chloride. The metal sheet can be of magnetic material such as Alnico VI or of magnetizable material such as an iron or nickel alloy. If the sheet is of magnetic material a separate magnetic element 110 may not be required. The plate 116 also can be of magnetic or magnetizable material if desired, and the diaphragm of non-metallic material, in which event the magnetic element 110 again may be omitted.

The housing 113 is formed in upper and lower portions 118 and 119, respectively held together by a V-band clamp 120. The outer periphery of the diaphragm 117 is held between the two portions of the housing in a liquid-tight seal. Thus, fluid is prevented from passing from one side of the diaphragm to the other or from the inside to the outside of the housing. The upper and lower portions of the housing between them define a chamber 121 provided with a lower recessed portion 122 to accommodate the plate 116. The large surface of the diaphragm provides great sensitivity to small changes in pressure differential across the faces of the diaphragm.

Introduction of fluid within the chamber 121 to both sides of the diaphragm 117 is by way of passage 127 and port 128 in the upper portion 118 of the housing, giving access to the portion of chamber 121 above the upper face of the diaphragm, and by way of passage 129 and port 130 in the lower portion 119 of the housing, giving access to chamber 122 and the lower face of the diaphragm. These, in turn, are connected to the portion of the fluid system or systems across which the pressure differential is to be detected by the pressure indicator.

In order to prevent dirt carried by fluid from entering ports 128 and 130 and from reaching the narrower passages 127 and 129, and clogging these passages or the chamber 121, filter elements (not shown) can be inserted in the enlarged outer portion of the ports.

In the embodiment of the invention shown in FIGURE 5 the pressure indicator is adapted to provide an electrical signal to warn of a clogged filter or to stop fluid flow. To accomplish this purpose a switch 139 is mounted in a recess 140 affixed to the upper portion of the housing 118. Also mounted in a recess is a lever 141 pivotally supported on the housing so as to extend above the cap 132. Attached to one end of the arm 141 is an adjusting or set screw 142 and attached to the other end of the arm is a switch actuator 143, movable by the arm to actuate the switch 139 when the cap 132 rises into contact with the set screw 142 and sufficiently moves arm 141. In order to restrict the motion of the magnet 111 and prevent it from rising completely out of the bore 145, an opposing stop piece 144 is mounted in the housing in position to intercept the set screw 142 of the lever 141 at a limiting position so set as to stop the lever 141 after actuation to hold the magnet 111 within one-sixteenth of an inch of the normal position, thereby making the indicator automatically resetting by attraction of the magnetic element 110 upon return of the diaphragm 117 to the normal position. For this piece 144, there may be substituted a manually operated button to reset the magnet 111 after normal operating conditions are restored. To provide a remote signal of actuation of the indicator, or to shut off a flow, suitable conductors (not shown) from the switch 139 can be arranged in any conventional manner to complete appropriate electrical circuits whenever the switch is operated or reset.

In operation, fluid under pressure from port 128 passes through the passage 127 to the top of the chamber 121 above the diaphragm, urging the diaphragm assembly downward against the force of the annular spring disc 124, and the fluid pressure below the diaphragm communicated through passage 129 and port 130. Whenever the difference between the inlet and outlet pressure forces across the diaphragm is greater than the force of the annular spring disc 124 the diaphragm assembly is driven downwardly causing the disc to flex. The disc may continue to flex so that upon decrease of the pressure differential, the diaphragm would be returned to its normal position, or, upon flexing, it may snap through zero on its deflection curve, in which case the unit would have to be disassembled to restore the diaphragm to its normal position. This would help ensure that proper corrective action was taken as the unit would continue to give an indication until the disassembly was carried out. The disassembly, however, would be a simple task as only the screw 126 would have to be removed to gain access to the annular spring disc which could then be readily removed and the direction of bow reversed manually.

After the magnet 110 has moved to a position more than one-sixteenth of an inch away from the magnet 111 the attractive force between the two magnets is less than the force of the spring 134 and the magnetic element 111 is then driven away from the wall 112 until the cap 132 contacts and lifts set screw 142, thus raising the lever 141 to actuate the switch 139 through application of pressure to the switch actuator 143. When the diaphragm is fully deflected plate 116 enters recess 122 which serves as a stop to prevent further deflection and prevent damage from overpressuring. The stop piece 144 may be appropriately adjusted as described above to restrict the motion of the magnet 111, thereby making the indicator self-resetting when the pressure differential falls below the actuating pressure, unless the annular spring disc is selected to snap through and reverse its direction of bow instead of merely flexing. Thermostatic elements (not shown) may also be incorporated into this embodiment in a similar manner to that described for the other embodiments to prevent actuation below a specific temperature.

Although the invention has been described herein with reference to specific embodiments, many modifications and variations therein will readily occur to those skilled in the art. Accordingly, all such variations and modifications are included within the intended scope of the invention as defined by the following claims.

I claim:

1. A pressure indicating device comprising a housing, first magnetic means movably mounted in the housing towards and away from a first position, annular spring disc bias means urging the first magnetic means in one direction and normally retaining the first magnetic means in the first position, fluid duct means communicating with a source of fluid under pressure and with one end of the first magnetic means to urge it in the opposite direction, second magnetic means movable towards and away from the first magnetic means and normally retained towards the first magnetic means by magnetic attraction when the first magnetic means is in the first position, and bias means urging the second magnetic means away from the first magnetic means selected to overcome the force of magnetic attraction when the first magnetic means is more than a predetermined distance away from the second magnetic means.

2. A pressure indicator according to claim 1 wherein the spring disc means is bowed against the direction of movement away from the second magnetic means, and is adapted to pass through to a negative rate on its deflection curve at a predetermined fluid pressure, so as to retain such position until reset.

3. A pressure indicator acording to claim 1 wherein the spring disc means is bowed against the direction of movement away from the second magnetic means and is adapted to flex without passing to a negative rate on its deflection curve at an actuating pressure, so as to return to normal position when pressure returns to a value less than actuating pressure.

4. A pressure indicating device according to claim 1 wherein the first magnetic means comprises piston means movably mounted in the housing, the first magnetic means being movable with the piston towards and away from the first position.

5. A pressure indicating device according to claim 1 wherein the first magnetic means includes a flexible diaphragm movably mounted in the housing, the first magnetic means being movable with the diaphragm towards and away from the first position.

6. A pressure indicating device according to claim 1 comprising stop means limiting the motion of the second magnetic means.

7. A pressure indicating device acording to claim 1 comprising thermostat means operable to prevent the second magnetic means from moving away from the first position of the first magnetic means when the temperature is below a predetermined level.

8. A pressure indicating device according to claim 7 including flange means on the second magnetic means and wherein the thermostat means comprises a bimetallic strip adapted to bend towards the second magnetic means with decreasing temperature to engage the flange means.

References Cited by the Examiner

UNITED STATES PATENTS

| | | | |
|---|---|---|---|
| 1,988,345 | 1/35 | Vaughn. | |
| 2,236,206 | 3/41 | Becker. | |
| 2,604,316 | 7/52 | O'Brien et al. | |
| 2,942,572 | 6/60 | Pall | 116—70 |
| 3,077,176 | 2/63 | Pall et al. | 116—70 |
| 3,077,854 | 2/63 | Pall | 116—70 |

LOUIS J. CAPOZI, *Primary Examiner.*